July 4, 1939.  T. C. DELAVAL-CROW  2,164,449
LUBRICATING DEVICE
Filed June 22, 1937

INVENTOR:
THOMAS C. DELAVAL CROW,
BY
Gales P. Moore
HIS ATTORNEY

Patented July 4, 1939

2,164,449

UNITED STATES PATENT OFFICE 2,164,449

LUBRICATING DEVICE

Thomas C. Delaval-Crow, Bristol, Conn., assignor to General Motors Corporation, Detroit, Mich., a corporation of Delaware Application June 22, 1937, Serial No. 149,740

6 Claims. (Cl. 308—187)

This invention relates to lubricating devices and comprises all of the features of novelty herein disclosed. An object of the invention is to provide improved means to supply lubricant to an antifriction bearing or the like. Another object is to provide a lubricating device whereby adequate lubricant is continually supplied to a member needing lubrication while also insuring against an oversupply.

To these ends and also to improve generally upon devices of this general character, the invention consists in the various matters hereinafter described and claimed. In its broader aspects, the invention is not necessarily limited to the specific construction selected for illustrative purposes in the accompanying drawing in which Fig. 1 is an end elevation of the device with parts broken away and in section.

Figure 1:
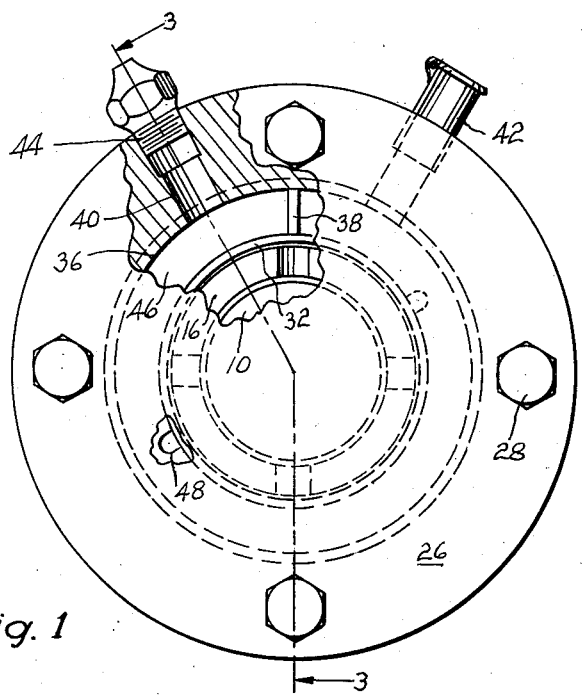
Figure 2:
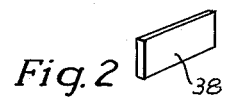
Fig. 2 is a perspective view of a partition.
Figure 3:
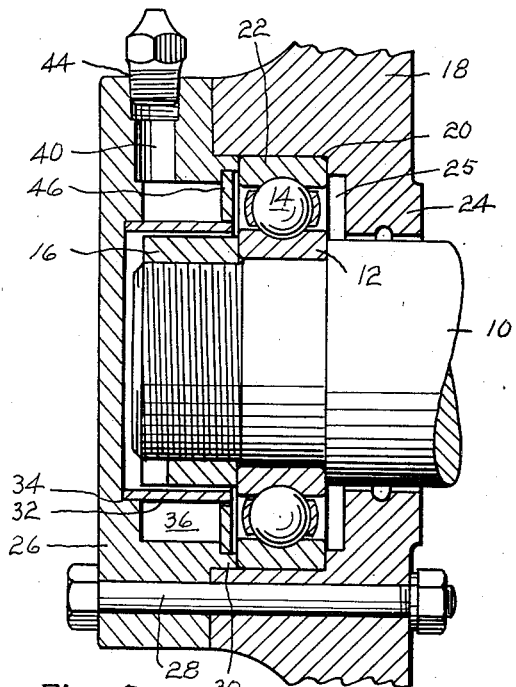
Fig. 3 is a sectional view taken on the line 3—3 of Fig. 1.

The numeral 10 indicates a shaft having a shoulder against which the inner race ring 12 of a ball bearing 14 is clamped by a nut 16. A housing wall 18 having a shouldered seat 20 receives the outer race ring 22 of the bearing. The housing wall 18 may be, for example, the end ball of a motor housing or the like but the invention is applicable generally to a bearing between relatively rotatable members. A flange 24 extends down close to the shaft 10 and is provided with a grease groove. The flange is spaced from the antifriction bearing to leave an air chamber or space 25 alongside the bearing and open to it.

A detachable housing part in the form of a cover plate or cap 26 surrounds the end of the shaft and the nut 16 and is secured by bolts 28 to the housing wall 18, an axial pilot flange 30 entering the bearing seat. A sleeve 32 is pressed into an annular seat 34 of the cap or otherwise secured and forms an annular lubricant receptacle or reservoir 36 with the surrounding wall of the cap. The reservoir is conveniently of rectangular cross section and is provided with a partition 38. The partition lies between and adjacent to an inlet opening 40 and an outlet opening or overflow pipe 42. A grease fitting 44 provides for introduction of lubricant under pressure to the inlet opening, as from a grease gun or collapsible grease container. Fitting within the pilot flange 30 against a shoulder is a barrier in the form of a washer 46 provided with one or more notches or openings 48 forming restricted passages leading to the rolling elements 14 of the bearing. Each opening is of smaller area than that of the overflow pipe 42.

When grease is forced into the inlet opening 40, it follows the path of least resistance and travels circumferentially of the reservoir 36. The partition 38 arrests circumferential travel and the grease flows out of the overflow pipe 42 without any grease passing through the restricted side openings 48 to the bearing. This overflow of grease is a reliable indication that the lubricant reservoir is full of grease and that none is in the bearing. To initially lubricate the bearing, the overflow may be temporarily blocked while a small quantity of additional grease is forced in, this small quantity then necessarily flowing through the restricted openings 48 to the bearing. Thus, sufficient lubrication of the bearing is assured without the common fault of overlubrication which results in churning of the lubricant and consequent undue heating and deterioration. Ball bearings require very little lubricant so that the supply in the reservoir will last a long time.

During operation of the bearing after such initial filling of the reservoir, grease in minute quantities works into the bearing from the reservoir, the motion of the rolling elements and their separator tending to suck lubricant in through the openings 48. Some heat is also produced which tends to soften or make the grease more liquid. The air chamber or space 25 opposite to the supply helps to make this small flow effective probably because it aids the rotating parts to produce some flow of air away from the grease supply instead of towards it as would occur with the opposite side of the bearing sealed up tight. If replenishment of lubricant in the reservoir 36 is needed, applying grease under pressure to the inlet until it appears at the overflow will insure refilling of the reservoir before feeding grease directly to the bearing.

I claim:

1. In a device of the character indicated, a shaft, a member surrounding the shaft, an antifriction bearing between the shaft and the member to mount them for relative rotation, a lubricant receptacle alongside the bearing and closed off from the shaft, the receptacle having a grease inlet and an outlet, a partition between the inlet and the outlet and adjacent to each to compel grease to fill the receptacle before reaching the outlet, a barrier between the receptacle and the bearing and having a restricted passage for lubricant, and the bearing being open at the side opposite to the barrier; substantially as described.

2. In a device of the character indicated, a shaft, a member surrounding the shaft, an antifriction bearing between the shaft and the member to mount them for relative rotation, a cover plate having an annular recess forming a grease receptacle surrounding and partitioned off from the shaft and arranged alongside of the bearing, an annular barrier between said receptacle and the bearing and having a restricted passage leading to the bearing, the receptacle having an inlet and an overflow outlet, the outlet being of larger area than the restricted passage; substantially as described.

3. In a device of the character indicated, a shaft, a member surrounding the shaft, an antifriction bearing between the shaft and the member to mount them for relative rotation, a cover plate having an annular recess forming a grease receptacle surrounding the shaft and lying adjacent to the bearing, the receptacle having a partition with an inlet at one side and an outlet at the other, and the receptacle having a restricted passage leading to the bearing; substantially as described.

4. In a device of the character indicated, a shaft, a member surrounding the shaft, an antifriction bearing between the shaft and the member to mount them for relative rotation, a grease receptacle adjacent to the bearing, and means for insuring the filling of the receptacle with grease before grease reaches the bearing, said means comprising a filling opening and an overflow opening with a partition between them, and the receptacle having a restricted passage leading to the bearing and of smaller size than the outlet; substantially as described.

5. In a device of the character indicated, a shaft, a housing, an antifriction bearing between the shaft and the housing, a cap secured to the housing, a sleeve in the cap and spaced from a peripheral wall thereof to form an annular grease receptacle partitiond off from the shaft, a washer across the end of the receptacle adjacent to the bearing and having a restricted passage, and means for filling the receptacle with grease; substantially as described.

6. In a device of the character indicated, a shaft, and a housing, an antifriction bearing between the shaft and the housing, a cap secured to the housing, a sleeve in the cap and spaced from a peripheral wall thereof to form an annular grease receptacle, a partition in the receptacle, the receptacle having an inlet on one side of the partition and an outlet on the other, and means substantially closing the space between the receptacle and the bearing; substantially as described.

THOMAS C. DELAVAL-CROW.